United States Patent
Goto

(10) Patent No.: US 11,809,853 B2
(45) Date of Patent: Nov. 7, 2023

(54) IN-VEHICLE SOFTWARE UPDATING METHOD AND IN-VEHICLE SYSTEM

(71) Applicant: YAZAKI CORPORATION, Tokyo (JP)

(72) Inventor: Jun Goto, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 98 days.

(21) Appl. No.: 17/710,958

(22) Filed: Mar. 31, 2022

(65) Prior Publication Data
US 2022/0326934 A1    Oct. 13, 2022

(30) Foreign Application Priority Data

Apr. 7, 2021   (JP) .................................. 2021-065458

(51) Int. Cl.
G06F 8/65    (2018.01)
B60R 16/023   (2006.01)
G06F 11/07   (2006.01)
G06F 11/30   (2006.01)

(52) U.S. Cl.
CPC ............ *G06F 8/65* (2013.01); *B60R 16/0234* (2013.01); *G06F 11/0796* (2013.01); *G06F 11/3003* (2013.01); *G06F 2201/81* (2013.01)

(58) Field of Classification Search
CPC .... G06F 8/65; G06F 11/0796; G06F 11/3003; G06F 2201/81; B60R 16/0234
See application file for complete search history.

(56) References Cited

U.S. PATENT DOCUMENTS

| 2012/0213538 | A1* | 8/2012 | Tomaru | G03G 15/502 399/27 |
| 2013/0197712 | A1 | 8/2013 | Matsuura et al. | |
| 2013/0232366 | A1* | 9/2013 | Nishijima | G06F 1/3275 713/324 |
| 2018/0081671 | A1* | 3/2018 | Naruse | B60R 16/0231 |
| 2020/0174779 | A1* | 6/2020 | David | G06F 8/654 |
| 2020/0215930 | A1* | 7/2020 | Izumi | B60R 16/02 |
| 2021/0188108 | A1 | 6/2021 | Kikuchi et al. | |
| 2023/0052810 | A1* | 2/2023 | Endo | G05B 19/0426 |

FOREIGN PATENT DOCUMENTS

| DE | 102020132257 A1 | 6/2021 |
| JP | 2008-155892 A | 7/2008 |
| WO | 2012/017719 A1 | 2/2012 |
| WO | 2019/030985 A1 | 2/2019 |

\* cited by examiner

*Primary Examiner* — Hang Pan
*Assistant Examiner* — Noor Alkhateeb
(74) *Attorney, Agent, or Firm* — KENEALY VAIDYA LLP

(57) ABSTRACT

An in-vehicle software updating method includes: acquiring, after starting a software update, a voltage measurement value of an in-vehicle power source; and acquiring a progress rate in the software update in a case in which the voltage measurement value is equal to or less than a second threshold. In a case in which the progress rate is less than a set value, the software update is interrupted. In a case in which the progress rate is equal to or greater than the set value, an operation mode of the zone control unit is switched to a power saving mode, and a second predicted voltage value of the in-vehicle power source at the update completion time is calculated. The software update is continued in a case in which the second predicted voltage value is greater than a first threshold.

5 Claims, 10 Drawing Sheets

IN-VEHICLE SOFTWARE UPDATING METHOD AND IN-VEHICLE SYSTEM

CROSS-REFERENCE TO RELATED APPLICATIONS

This application is based on and claims the benefit of priority of Japanese Patent Application No. 2021-065458 filed on Apr. 7, 2021, the entire contents of which are incorporated herein by reference.

FIELD

The present disclosure relates to an in-vehicle software updating method and an in-vehicle system.

BACKGROUND

In recent vehicles, an attempt is made to adopt an Over The Air (OTA) software update system that updates software of an in-vehicle system using wireless communication. However, such software update has various problems.

Therefore, for example, JP-A-2008-155892 discloses that a remaining capacity of a battery is calculated based on a voltage value and a temperature that are read, and an amount of electricity (current value×time) of the battery consumed during a time of rewriting of a memory is predicted based on a time and a current value that are required for the rewriting of the memory. Further, JP-A-2008-155892 discloses that when the remaining capacity does not exceed the predicted amount of electricity, rewriting processing is restarted after power consumption is reduced for an area to which a rewriting target does not belong.

WO-A1-2012/017719 discloses that a state of a battery after a program of an ECU is rewritten is predicted based on a state of the battery at start of rewriting the program and a scheduled processing time for rewriting the program, and the program is rewritten when the predicted state of the battery satisfies a condition that a vehicle can be restarted.

WO-A1-2019/030985 discloses a first acquisition unit that acquires a remaining power amount of a battery, a second acquisition unit that acquires a predicted amount of power consumption in each in-vehicle control device until a time point when update of a control program is completed, and a determination unit that determines whether a predicted remaining power amount of the battery at the time point of update completion is equal to or greater than a threshold based on the remaining power amount of the battery and the predicted amount of power consumption. Further, WO-A1-2019/030985 discloses that when it is determined that the predicted remaining power amount is less than the threshold during the update of the control program, a user interface device is caused to perform an information output prompting a charging start operation for the battery.

SUMMARY

As disclosed in JP-A-2008-155892, WO-A1-2012/017719 and WO-A1-2019/030985, when software is updated, control is generally performed in consideration of a remaining capacity of a battery and a predicted amount of power consumption during a software update period. However, due to various causes, a state may not actually change as predicted.

As a result, the update of the software may be interrupted in the middle. Then, after restoring to a state in which the software can be updated again, the software is updated again from the beginning. Therefore, the same operation is repeated many times from the beginning, and thus wasted processing is executed, and extra power of the power source is consumed. Further, when the number of electronic control units (ECUs) to be updated is large, a time required to complete software update of an entire system may be significantly longer due to an influence of repetitive processing that increases a wasted time.

The present disclosure has been made in view of the above circumstances, and an object thereof is to provide an in-vehicle software updating method and an in-vehicle system capable of reducing wasted power consumption and wasted time caused by interruption of software update.

The present disclosure provides an in-vehicle software updating method for updating software in an in-vehicle system, the in-vehicle system including a zone control unit configured to manage a plurality of control targets connected on a downstream side of the zone control unit, the in-vehicle software updating method including: retaining update data in a first area allocated in advance in a memory of the zone control unit; calculating, before starting software update using the update data, a first predicted voltage value of an in-vehicle power source at an update completion time; starting the software update in a case in which the first predicted voltage value is greater than a first threshold; acquiring, after starting the software update, a voltage measurement value of the in-vehicle power source; acquiring a progress rate in the software update in a case in which the voltage measurement value is equal to or less than a second threshold, the second threshold being greater than the first threshold; interrupting the software update in a case in which the progress rate is less than a set value; and switching an operation mode of the zone control unit to a power saving mode in a case in which the progress rate is equal to or greater than the set value, calculating a second predicted voltage value of the in-vehicle power source at the update completion time, and continuing the software update in a case in which the second predicted voltage value is greater than the first threshold.

The present disclosure provides an in-vehicle system including: a zone control unit configured to manage a plurality of control targets connected on a downstream side of the zone control unit, wherein a memory of the zone control unit has a first area configured to retain update data usable for software update of the plurality of control targets, and wherein the zone control unit is configured to: calculate, before starting software update using the update data in the first area, a first predicted voltage value of an in-vehicle power source at an update completion time, start the software update in a case in which the first predicted voltage value is greater than a first threshold, acquire, after starting the software update, a voltage measurement value of the in-vehicle power source, acquire a progress rate in the software update in a case in which the voltage measurement value is equal to or less than a second threshold, the second threshold being greater than the first threshold, interrupt the software update in a case in which the progress rate is less than a set value, and switch an operation mode of the zone control unit to a power saving mode in a case in which the progress rate is equal to or greater than the set value, calculate a second predicted voltage value of the in-vehicle power source at the update completion time, and continue the software update in a case in which the second predicted voltage value is greater than the first threshold.

The present disclosure has been briefly described above. Further, details of the present disclosure will be clarified by reading an aspect (hereinafter, referred to as an "embodiment") for implementing the invention to be described below with reference to the accompanying drawings.

DETAILED DESCRIPTION

A specific embodiment according to the present disclosure will be described below with reference to the accompanying drawings.

<In-Vehicle System Configuration>

Figure 1:
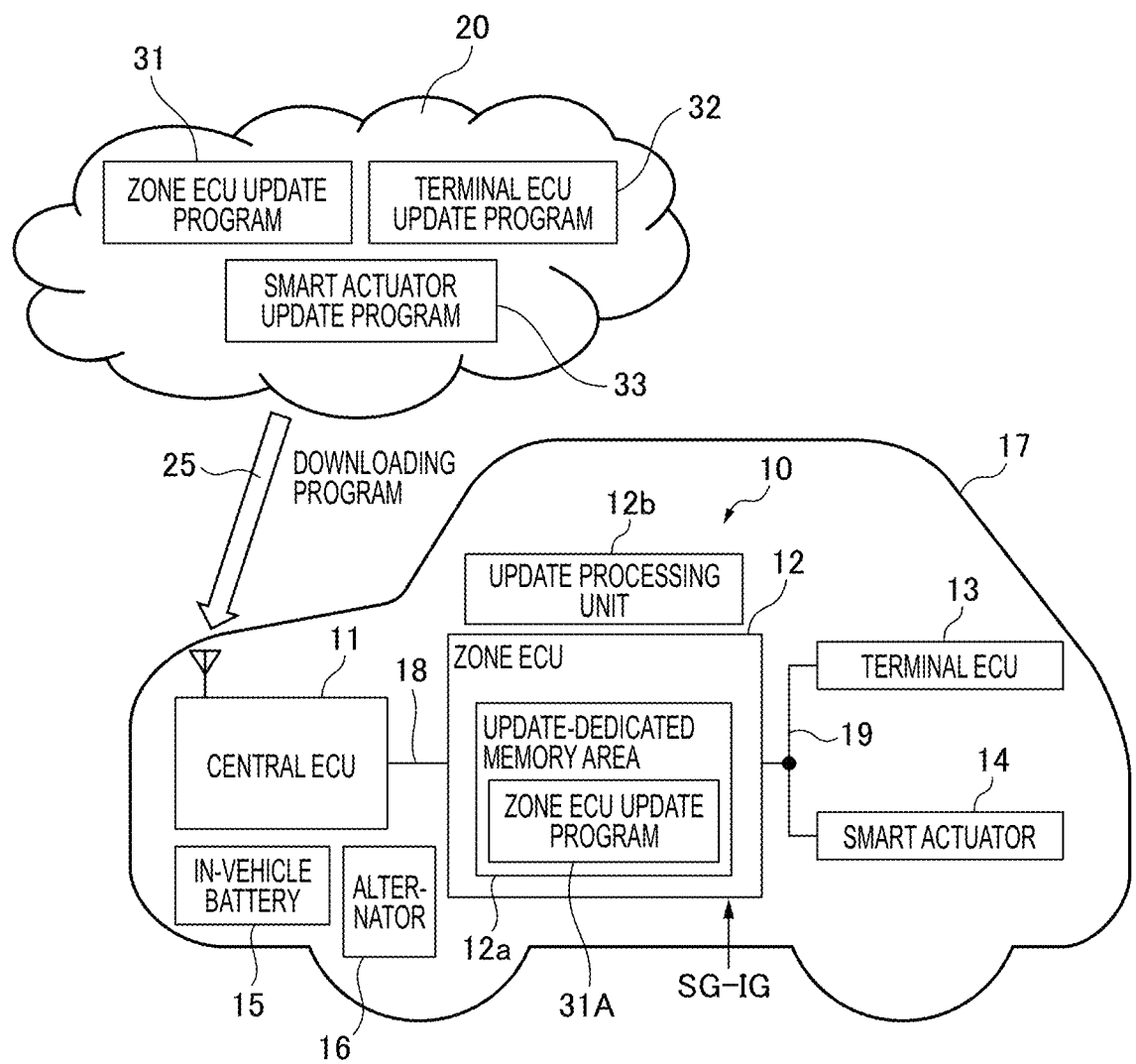
FIG. 1 is a block diagram showing a configuration of an in-vehicle system according to an embodiment of the present disclosure.
Figure 2:
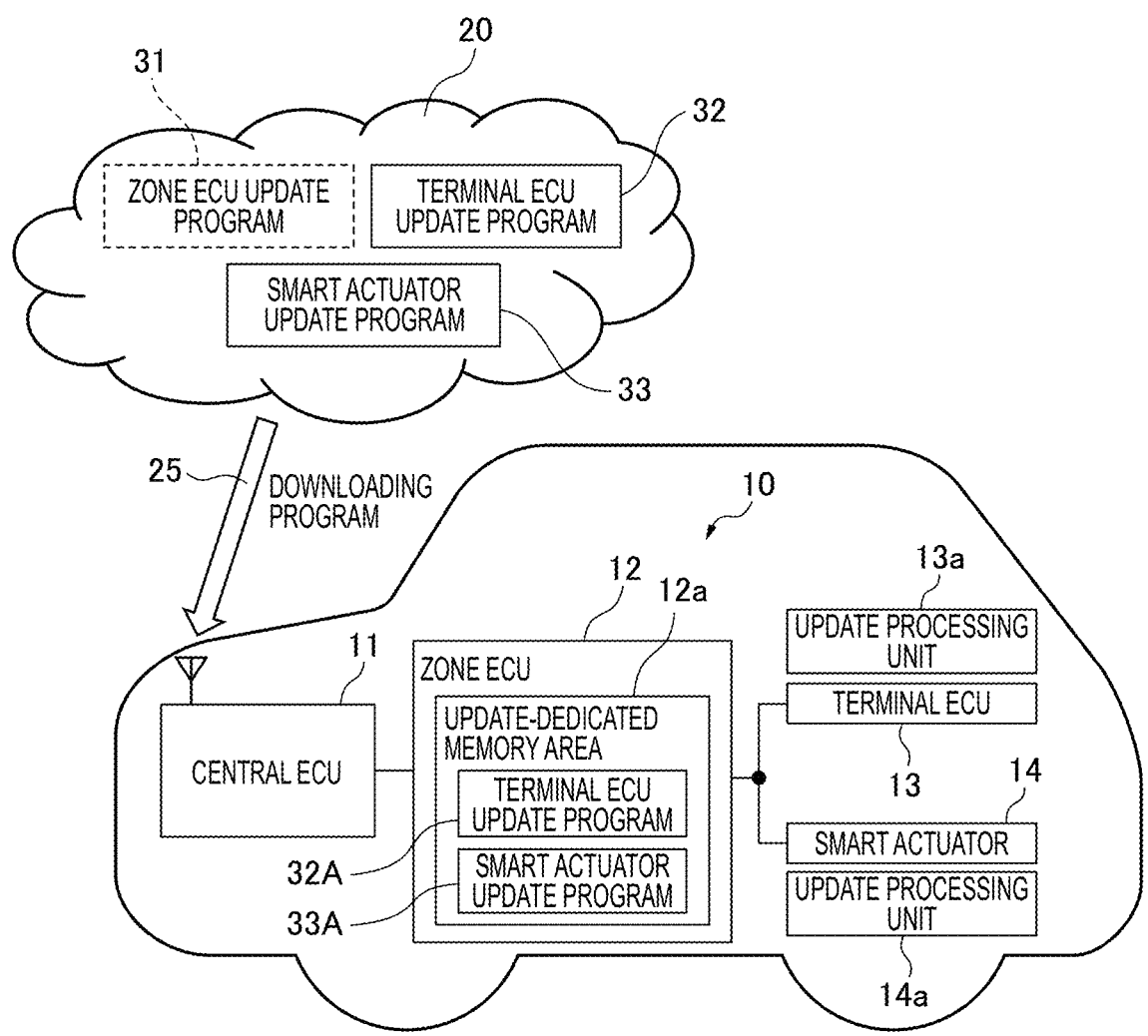
FIG. 2 is a block diagram showing the in-vehicle system in a state different from that in FIG. 1.

FIG. 1 is a block diagram showing a configuration of an in-vehicle system 10 according to an embodiment of the present disclosure. FIG. 2 is a block diagram showing the in-vehicle system 10 in a state different from that in FIG. 1.

The in-vehicle system 10 mounted on a vehicle 17 shown in FIG. 1 includes a central ECU 11, a zone ECU 12, a terminal ECU 13, a smart actuator 14, and the like. The central ECU 11 is connected to the zone ECU 12 by a communication line 18, and the zone ECU 12 is connected to the terminal ECU 13 and the smart actuator 14 by a communication line 19.

In an actual vehicle, the vehicle 17 is formed with a plurality of zones, and the independent zone ECUs 12 are provided for the respective zones. That is, the central ECU 11 is connected to a plurality of zone ECUs 12. The zones may be assigned as a plurality of areas representing a difference in locations such as left and right in a space of the vehicle 17, or may be assigned as a plurality of areas representing a difference in functional groups.

The central ECU 11 has a function of integrating and managing the entire in-vehicle vehicle system 10 including the plurality of zones, and also has a gateway function for securely connecting the in-vehicle system 10 to a communication network such as the Internet outside the vehicle using a wireless communication function.

Therefore, the zone ECU 12 shown in FIG. 1 is connected on a downstream side of the central ECU 11 located at a highest level of the vehicle 17. The zone ECU 12 manages the terminal ECU 13 and the smart actuator 14 connected on a downstream side of the zone ECU 12.

The central ECU 11, the zone ECU 12, and the terminal ECU 13 each incorporate a microcomputer capable of independent control, and a communication function. The smart actuator 14 has a function of changing a function of an actuator by software, and a communication function.

Therefore, the zone ECU 12, the terminal ECU 13, and the smart actuator 14 shown in FIG. 1 each include software constituted by programs and data required for operations thereof. Each software is in a rewritable state by, for example, being installed on a non-volatile memory. Therefore, each software can be updated as necessary. In the present embodiment, these software updates (SUs) can be performed by Over The Air (OTA) using wireless communication.

The in-vehicle system 10 shown in FIG. 1 manages all updates of software used by the zone ECU 12 and software used respectively by the terminal ECU 13 and the smart actuator 14. The zone ECU 12 includes an update-dedicated memory area 12a (an OTA SU memory area).

In the vehicle 17 shown in FIG. 1, power from the power source required for the in-vehicle system 10 to operate can be supplied from an in-vehicle battery 15 and an alternator 16 provided in the vehicle 17. However, when an engine stops, the alternator 16 stops power generation, and thus when the vehicle 17 is parked, power stored in the in-vehicle battery 15 can be used alone.

When the in-vehicle battery 15 is abnormally consumed, power supply from the in-vehicle battery 15 may be limited. Whether the alternator 16 is operating can be identified by turning on or off the ignition. The zone ECU 12 shown in FIG. 1 monitors an ignition signal SG-IG output from the vehicle 17 to identify the on or off of the ignition.

The in-vehicle system 10 in the present embodiment is provided with a cloud 20 as a supply source of update data for updating the software of each unit. The cloud 20 is disposed, for example, on a server in a predetermined data center. The cloud 20 has a function of providing the update data required for the software update of the in-vehicle system 10.

Therefore, when the software for the zone ECU 12, the software for the terminal ECU 13, and the software for the smart actuator 14 are prepared to be updated, as shown in FIG. 1, a zone ECU update program 31, a terminal ECU update program 32, and a smart actuator update program 33 corresponding to the respective update targets are stored in the cloud 20.

In a state in FIG. 1, the in-vehicle system 10 can download and acquire the zone ECU update program 31, the terminal ECU update program 32, and the smart actuator update program 33 by a wireless data communication 25. In an example shown in FIG. 1, a zone ECU update program 31A downloaded from the cloud 20 is stored in the update-dedicated memory area (first area) 12a. The zone ECU update program 31A is the same copy as the zone ECU update program 31 on the cloud 20.

An update processing unit 12b of the zone ECU 12 can read the zone ECU update program 31A in the update-dedicated memory area 12a, and update the software thereof.

In a state in FIG. 2, a terminal ECU update program 32A and a smart actuator update program 33A obtained by downloading are stored in the update-dedicated memory area 12a. The terminal ECU update program 32A and the smart actuator update program 33A are copies of the same contents as the terminal ECU update programs 32 and the smart actuator update program 33 on the cloud 20, respectively.

Therefore, in the state in FIG. 2, an update processing unit 13a can acquire the terminal ECU update program 32A in the update-dedicated memory area 12a by communication, and update the software of the terminal ECU 13. An update processing unit 14a can acquire the smart actuator update program 33A in the update-dedicated memory area 12a by communication, and update the software of the smart actuator 14.

Normally, when update data having a large capacity is to be downloaded by the wireless data communication 25, it can be expected that each unit of the in-vehicle system 10 consumes a relatively large amount of power from the power source for a long time. Therefore, in the present embodiment, each update data is downloaded when the ignition of the vehicle 17 is on.

On the other hand, when the software on the in-vehicle system 10 is actually updated using the downloaded update data, it is desirable that the update is less likely to be affected by an interrupt or the like from other ECUs unrelated to the update target. When the software is actually updated, it is possible to limit operations of other ECUs unrelated to the update target to reduce power consumption of the entire system. Therefore, the in-vehicle system 10 in the present embodiment executes the software update when the ignition of the vehicle 17 is off.

However, when the ignition of the vehicle 17 is off, the power stored in the in-vehicle battery 15 can be supplied alone, and thus it is necessary to prevent the vehicle 17 from getting stuck due to running out of battery. A considerably long time is required to read the downloaded update data, start the software update, and complete the software update. Since the zone ECU 12 and the like continuously consumes the power from the power source during this period, the zone ECU 12 is required to perform special control as described later so as not to cause the running out of battery.

<Zone ECU Configuration>

Figure 3:
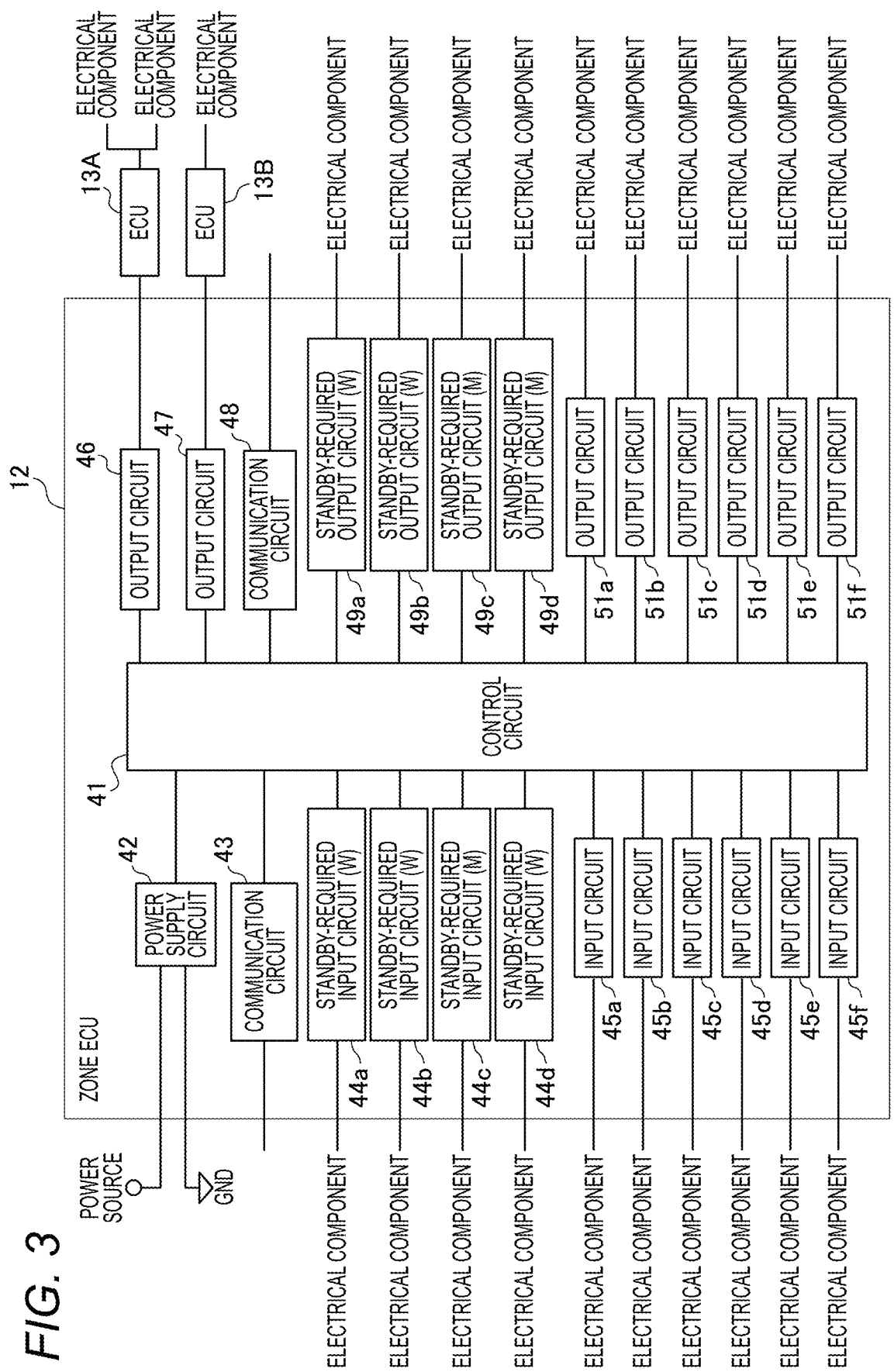
FIG. 3 is a block diagram showing a specific example of an internal configuration of a zone ECU.

FIG. 3 is a block diagram showing a specific example of an internal configuration of the zone ECU 12.

The zone ECU 12 shown in FIG. 3 incorporates a control circuit 41, a power supply circuit 42, a communication circuit 43, four systems of standby-required input circuits 44a to 44d, six systems of input circuits 45a to 45f, output circuits 46 and 47, a communication circuit 48, four systems of standby-required output circuits 49a to 49d, and six systems of output circuits 51a to 51f.

The control circuit 41 incorporates various control elements such as a processor (the microcomputer in the present embodiment) and a memory, similarly to a general computer unit. Various software required for the microcomputer to operate is stored in a non-volatile memory so as to be updatable. The instructions of the software or the like stored in the memory (for example, a non-transitory computer-readable medium), when executed by the processor, cause the zone ECU 12 to perform operations, for example, of an in-vehicle software updating method in the present embodiment.

In the example in FIG. 3, two ECUs 13A and 13B are connected to output sides of the output circuits 46 and 47 of the zone ECU 12.

The power supply circuit 42 in the zone ECU 12 is connected to a power source and a ground (GND) of the vehicle 17.

The communication circuits 43 and 48 in the zone ECU 12 are connected to a communication network on the vehicle 17, such as a controller area network (CAN), and are used for communication between the zone ECU 12 and other ECUs.

The four systems of standby-required input circuits 44a to 44d and the six systems of input circuits 45a to 45f each are an interface for inputting a signal from an in-vehicle electrical component assigned in advance, and are divided into three types. The six systems of input circuits 45a to 45f are divided into a group in which an operation is permitted in a normal state alone, as in a case where the ignition is on. The four systems of standby-required input circuits 44a to 44d are divided into a standby-required group such that a standby operation can be performed even when the ignition is off, and further divided into two groups of "M: Must" and "W: Want" according to a degree of importance.

The standby-required group (M) is assigned an important function that is desired to be operated until a low voltage is reached, such as an event data recorder or intrusion detection. The standby-required group (W) is assigned a comfortable and convenient function having a relatively low degree of importance, such as a remote keyless device or a smart key.

The four systems of standby-required output circuits 49a to 49d and the six systems of output circuits 51a to 51f are interfaces for outputting a signal to the in-vehicle electrical component assigned in advance, and are divided into three types as described above.

That is, the six systems of output circuits 51a to 51f are divided into the group in which the operation is permitted in the normal state alone, as in the case where the ignition is on. The four systems of standby-required output circuits 49a to 49d are divided into the standby-required group (M) or the standby-required group (W).

<State Change of Zone ECU>

Figure 4:
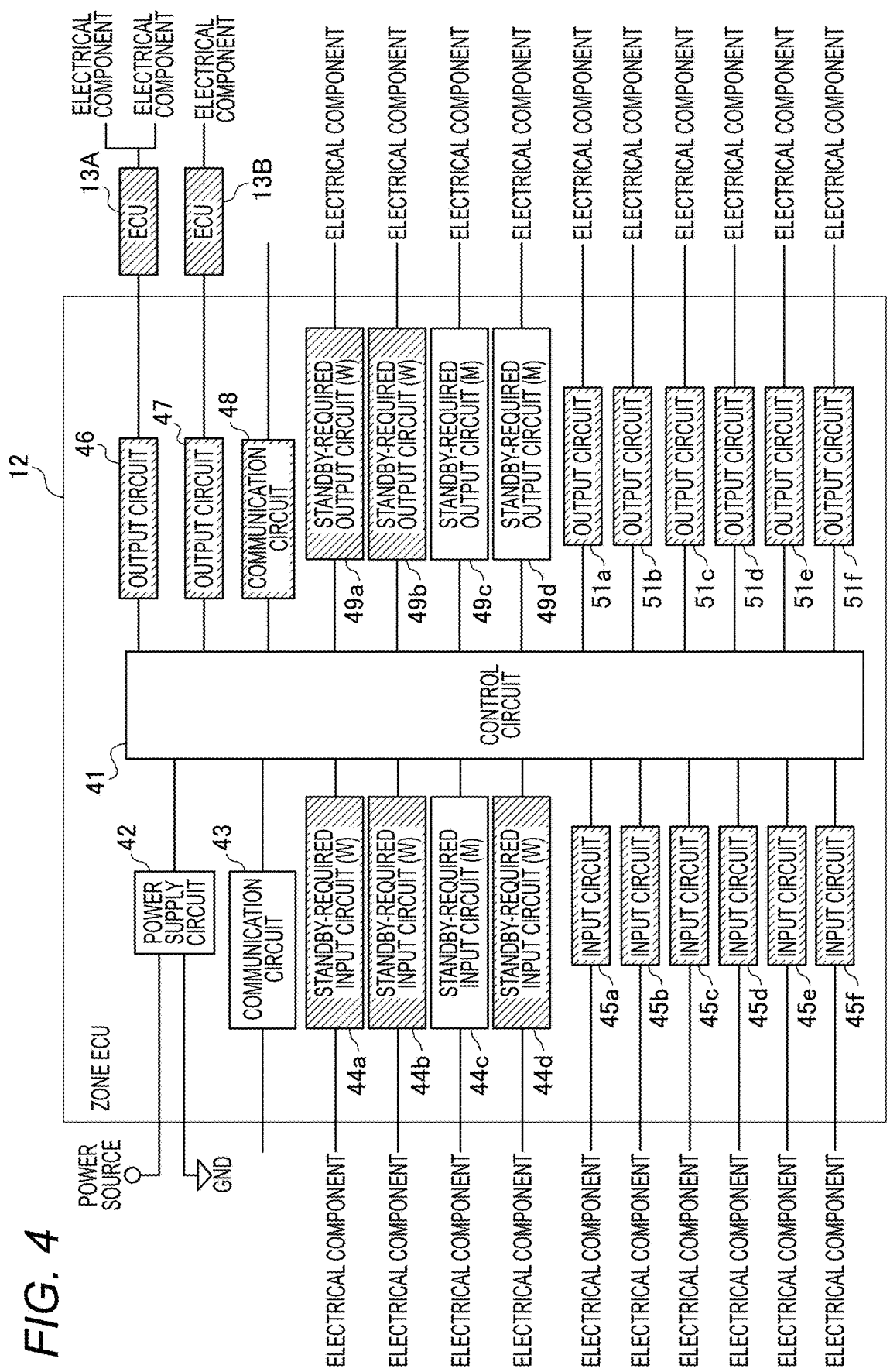
FIG. 4 is a block diagram showing an example of a state change of each component in the zone ECU shown in FIG. 3.

FIG. 4 is a block diagram showing an example of a state change of each component in the zone ECU 12 shown in FIG. 3.

In FIG. 4, among the components inside the zone ECU 12, components in an off-state to which the power from the power source is not supplied are hatched in blocks thereof. The ECUs 13A and 13B connected to the output sides of the zone ECU 12 are also hatched in respective blocks thereof in order to indicate that the power from the power source is not supplied.

In the example in FIG. 4, among the four systems of standby-required input circuits 44a to 44d, the standby-required input circuits 44a, 44b, and 44d belonging to the standby-required group (W) are in the off-state, and only the standby-required input circuit 44c belonging to the standby-required group (M) is maintained in an operable on-state. Among the four systems of standby-required output circuits 49a to 49d, the standby-required output circuits 49a and 49b belonging to the standby-required group (W) are in the off-state, and the standby-required output circuits 49c and 49d belonging to the standby-required group (M) are maintained in the on-state.

Actually, even when the ignition is off, when the zone ECU 12 updates the software, an operation mode of the zone ECU 12 shifts to a normal mode, and thus all the components in the zone ECU 12 are operable as shown in FIG. 3. Then, when the operation mode of the zone ECU 12 shifts to a power saving mode during the software update processing, the components in the zone ECU 12 are switched to the off-state except for the components required for minimum function execution as shown in FIG. 4.

<Example of Battery Voltage Change>
<Case where Software Update cannot be Started>

Figure 5:
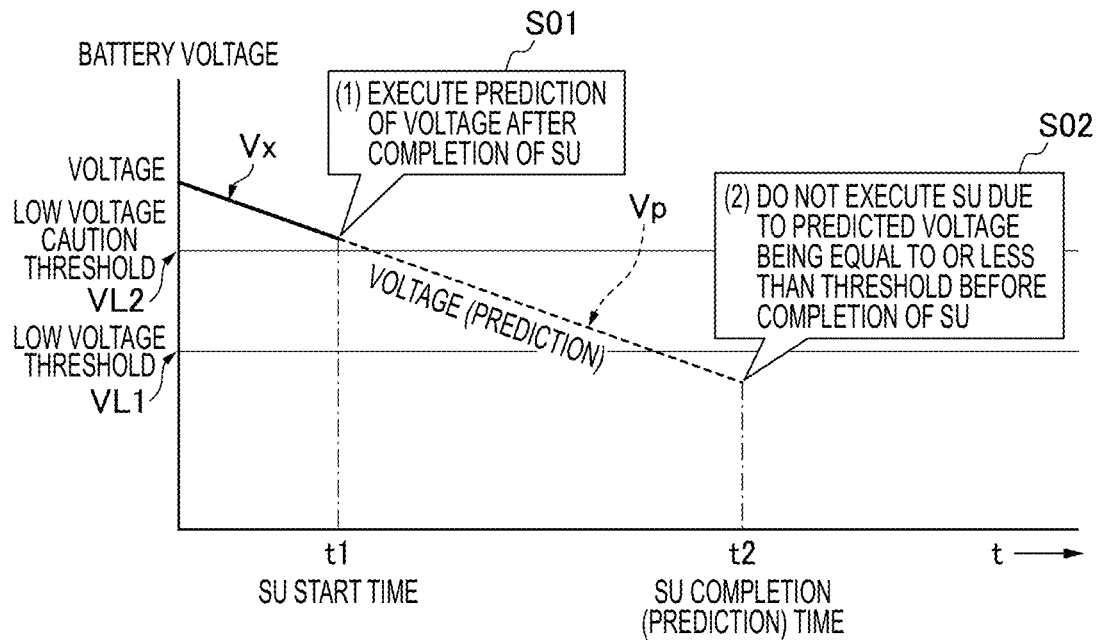
FIG. 5 is a time chart showing an example of a battery voltage change when software update cannot be started by voltage prediction.

FIG. 5 is a time chart showing an example of a battery voltage change when the software update cannot be started by voltage prediction. In FIG. 5, a horizontal axis represents a change in a time t, and a vertical axis represents a change in an output voltage [V] of the in-vehicle battery 15.

When the ignition of the vehicle 17 is turned off, power supply from the alternator 16 is stopped, and thus in a situation in which a power source current flows to a load such as the zone ECU 12, a voltage Vx (for example, a detection value) of the battery gradually decreases along a straight line having a substantially constant slope as indicated by a solid line in FIG. 5.

When the software update (SU) of the zone ECU 12 is to be started at a time point t1 shown in FIG. 5, it is necessary to confirm in advance whether a problem occurs in a voltage of the battery at a time point (t2) after the update is completed. Therefore, the zone ECU 12 calculates a predicted voltage Vp at the time point t1 in step S01, and compares a predicted voltage Vp at an update completion time point with a low voltage threshold VL1. The low voltage threshold VL1 is determined in advance based on a lowest power source voltage that is required to be maintained to prevent the battery of the vehicle 17 from running out.

In the example in FIG. 5, it is found at the time point t2 that the predicted voltage Vp is less than the low voltage threshold VL1 at the future time point t2. Therefore, at this time, the zone ECU 12 determines in step S02 that the software update is not started. Accordingly, for example, the operation mode of the zone ECU 12 is switched to a sleep state, so that a decrease in voltage of the in-vehicle battery 15 can be reduced, and thus the battery can be prevented from running out.

<Case where Software Update can be Started>

Figure 6:
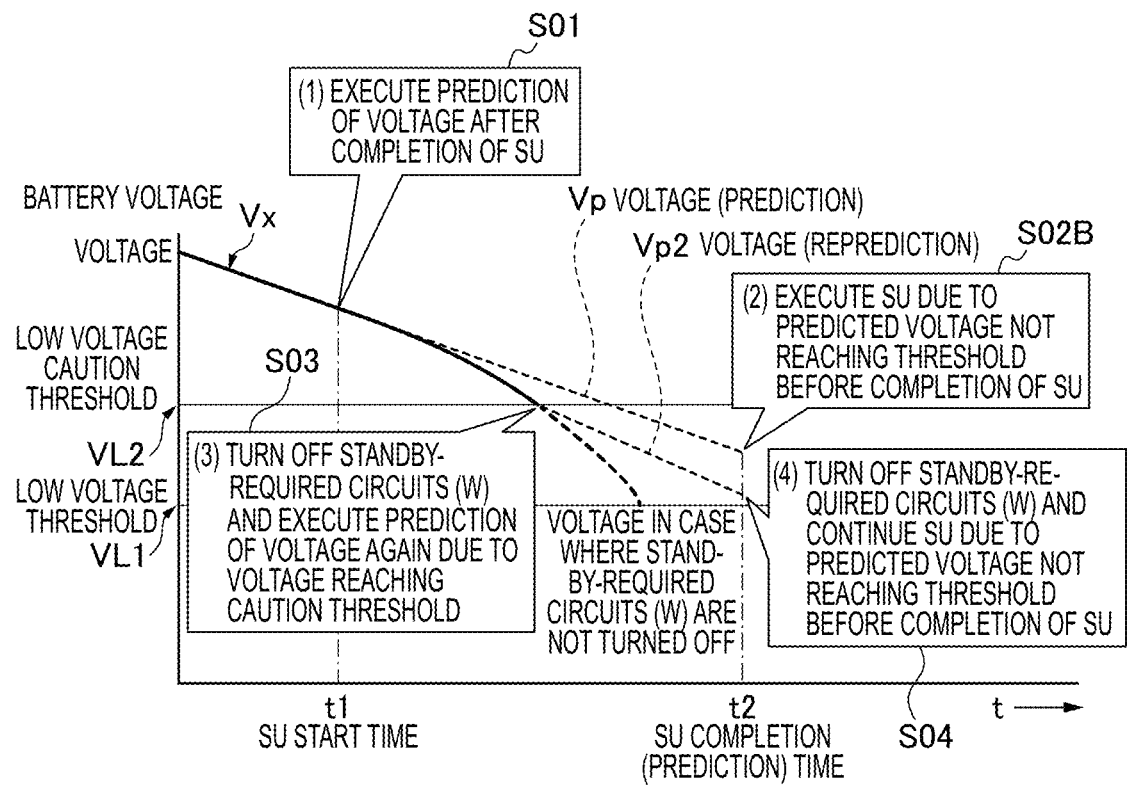
FIG. 6 is a time chart showing an example of a battery voltage change when the software update can be started by the voltage prediction.

FIG. 6 is a time chart showing an example of a battery voltage change when the software update can be started by the voltage prediction. In FIG. 6, a horizontal axis represents a change in the time t, and a vertical axis represents a change in the output voltage [V] of the in-vehicle battery 15.

In the example in FIG. 6, it is found that the predicted voltage Vp predicted in step S01 at the time point t1 is larger than the low voltage threshold VL1 at the software update end time point (t2). Therefore, the zone ECU 12 starts the software update at the time point t1 as step S02B.

However, an actual voltage Vx does not necessarily change in the same manner as the predicted voltage Vp, and the voltage Vx may decrease earlier than the predicted voltage Vp as shown in FIG. 6. Therefore, the zone ECU 12 compares the actual voltage Vx with a low voltage caution threshold VL2 to detect a decrease in voltage earlier than expected. The low voltage caution threshold VL2 is larger than the low voltage threshold VL1, and is determined in advance as a threshold to be noted for a decrease in the voltage Vx earlier than expected.

When the actual voltage Vx decreases to the low voltage caution threshold VL2, the zone ECU 12 turns off the standby-required circuits (W) in step S03, shifts the operation mode of the zone ECU 12 to the power saving mode, and executes prediction of a predicted voltage Vp2 again.

That is, in a case where the actual voltage Vx decreases to the low voltage caution threshold VL2, when the state is continued as it is, it is assumed that the voltage Vx decreases to a voltage equal to or less than the low voltage threshold VL1 earlier than the expected time point t2 at which the software update is completed. However, when the operation mode of the zone ECU 12 shifts to the power saving mode, a decrease speed of the voltage Vx is reduced, and thus there is a possibility that a state in which the voltage Vx exceeds the low voltage threshold VL1 can be maintained until the expected time point t2 at which the software update is completed. Therefore, the prediction of the predicted voltage Vp2 is executed again.

In the example in FIG. 6, it is determined that the predicted voltage Vp2 does not reach the low voltage threshold VL1 until the time point t2, and thus the zone ECU 12 continues the software update while the operation mode of the zone ECU 12 is the power saving mode (S04).

<Control of Software Update>

Figure 7:
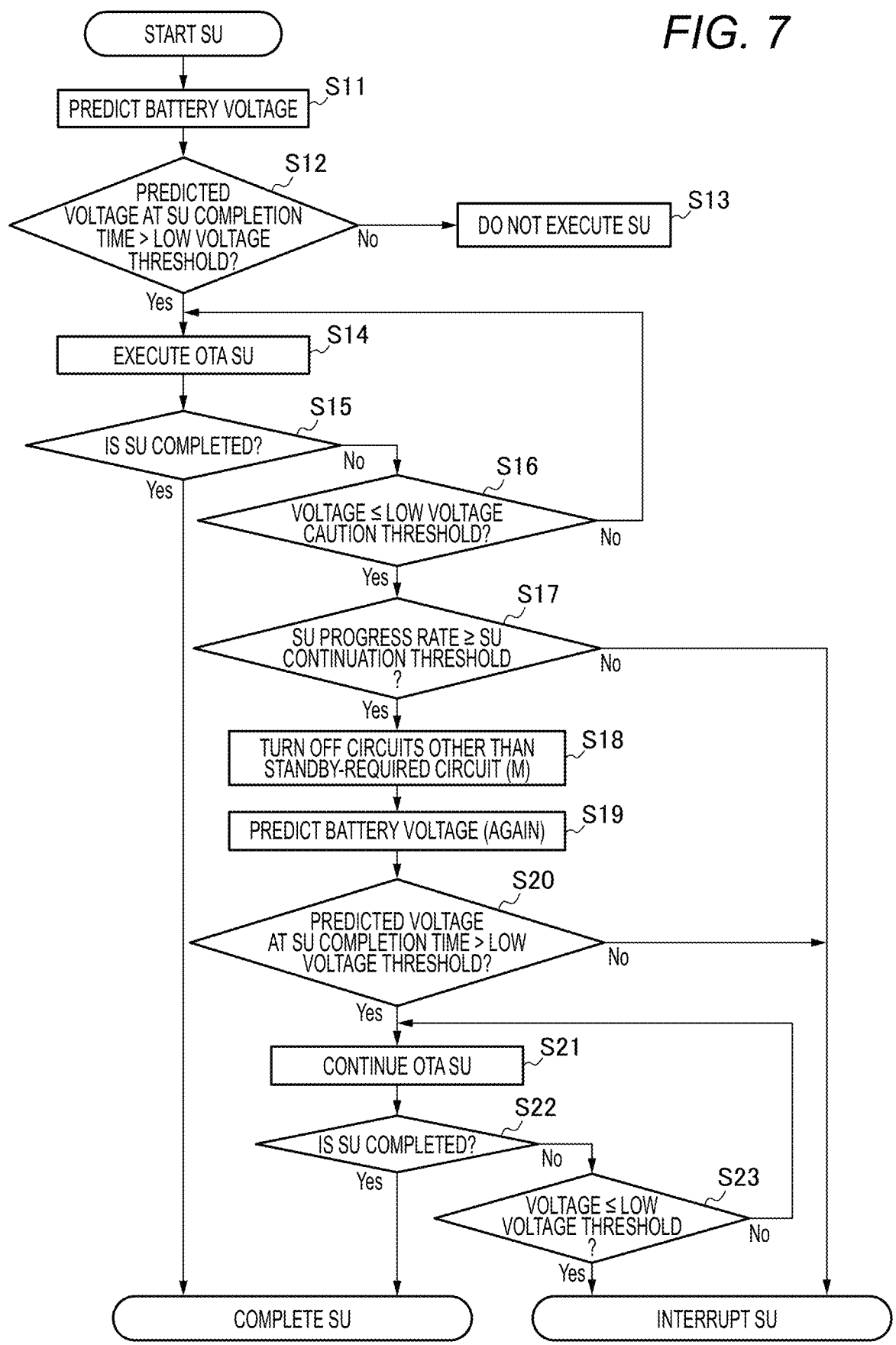
FIG. 7 is a flowchart showing control contents of the software update in the zone ECU.

FIG. 7 is a flowchart showing control contents of the software update in the zone ECU 12. The control in FIG. 7 will be described below.

The zone ECU 12 calculates the predicted voltage Vp as shown in FIGS. 5 and 6 in S11. For example, a future change in the voltage Vx at each time point t after the time point t1 can be predicted based on a change tendency of the voltage Vx detected before the time point t2 in FIG. 5 and the voltage Vx at the time point t2. That is, a predicted voltage Vp (t) can be estimated as a function of a straight line that approximates an expected change of the voltage Vx. Then, a value of the predicted voltage Vp at the time point (t2) at which the software update is completed can be calculated. A required time (t2 to t1) from the start of the software update to the completion of the software update can be estimated based on, for example, a size of update data existing in the update-dedicated memory area 12a, the number of files, and the like.

The zone ECU 12 compares a value Vp (t2) of the predicted voltage Vp at the expected software update completion time point (t2) with the low voltage threshold VL1 (S12). When the predicted voltage value Vp (t2) is equal to or less than the low voltage threshold VL1, the process proceeds to S13, and at this time, the software update is not started.

When the predicted voltage value Vp (t2) is larger than the low voltage threshold VL1, the process proceeds to S14, and the zone ECU 12 starts corresponding software update processing. Thereafter, the zone ECU 12 identifies in S15 whether the software update processing is completed, and if not, the process proceeds to S16. Then, the zone ECU 12 compares a latest voltage Vx actually detected by measurement with the low voltage caution threshold VL2 in S16. While a condition "Vx≤VL2" is not satisfied, the process returns from S16 to S14, and the zone ECU 12 continues the software update processing as it is.

When the zone ECU 12 detects that the voltage Vx is equal to or less than the low voltage caution threshold VL2, the process proceeds from S16 to S17. Then, a current progress rate Rx of the software update is calculated, and the progress rate is compared with a predetermined update continuation threshold R1. The progress rate Rx can be calculated, for example, as a ratio based on a data capacity and the number of files updated by the zone ECU 12 before a present time in the update data in the update-dedicated memory area 12a, and a capacity of the entire update data and the total number of files.

Here, when the current progress rate Rx is less than the update continuation threshold R1, the zone ECU 12 interrupts the software update in S17.

When the current progress rate Rx is equal to or greater than the update continuation threshold R1, the process proceeds from S17 to the S18, and the zone ECU 12 switches the operation mode of the zone ECU 12 to the power saving mode. That is, power supply to the circuits other than the standby-required circuits (M) required for continuing the subsequent processing is stopped, and the state shown in FIG. 4 is obtained. Accordingly, power consumption from the in-vehicle battery 15 can be reduced.

Next, in S19, the zone ECU 12 predicts again a change in the voltage Vx after that time point as the predicted voltage Vp2. At this time, the predicted voltage Vp2 is calculated in a state in which a change in the actual voltage Vx until S19 is executed and an influence of switching the operation mode of the zone ECU 12 to the power saving mode are reflected.

Next, the zone ECU 12 compares a calculated value Vp2 (t2) of the predicted voltage Vp2 at the software update completion time point (t2) with the low voltage threshold VL1 in S20. When the predicted voltage Vp2 (t2) at the software update completion time point is equal to or less than the low voltage threshold VL1 in S20, the software update is interrupted.

When the predicted voltage Vp2 (t2) at the software update completion time point is larger than the low voltage threshold VL1, the process proceeds from S20 to S21, and zone ECU 12 continues the software update currently being processed as it is.

Thereafter, the zone ECU 12 identifies in S22 whether the software update processing is completed, and if not, the process proceeds to S23. Then, the zone ECU 12 compares a latest voltage Vx actually detected by the measurement with the low voltage threshold VL1 in S23.

While a condition "Vx>VL1" is satisfied, the process returns from S23 to S21, and the zone ECU 12 continues the software update processing as it is. On the other hand, when a condition "Vx≤VL1" is satisfied in S23, the zone ECU 12 interrupts the software update.

Therefore, when the zone ECU 12 executes the control shown in FIG. 7, the operations shown in FIGS. 5 and 6 can be performed. That is, even when an actual decrease speed of the voltage Vx is faster than expected and "Vx≤VL2" after a condition "Vp1 (t2)>VL1" is satisfied in S12 and the software update is started, the operation mode of the zone ECU 12 is switched to the power saving mode when the progress rate Rx is large, so that the software update can be continued. Accordingly, the battery can be reliably prevented from running out, and a frequency of interruption of the software update can be reduced. That is, a situation in which the same software update is repeated many times can be reduced.

<Modification of Zone ECU>

Figure 8:
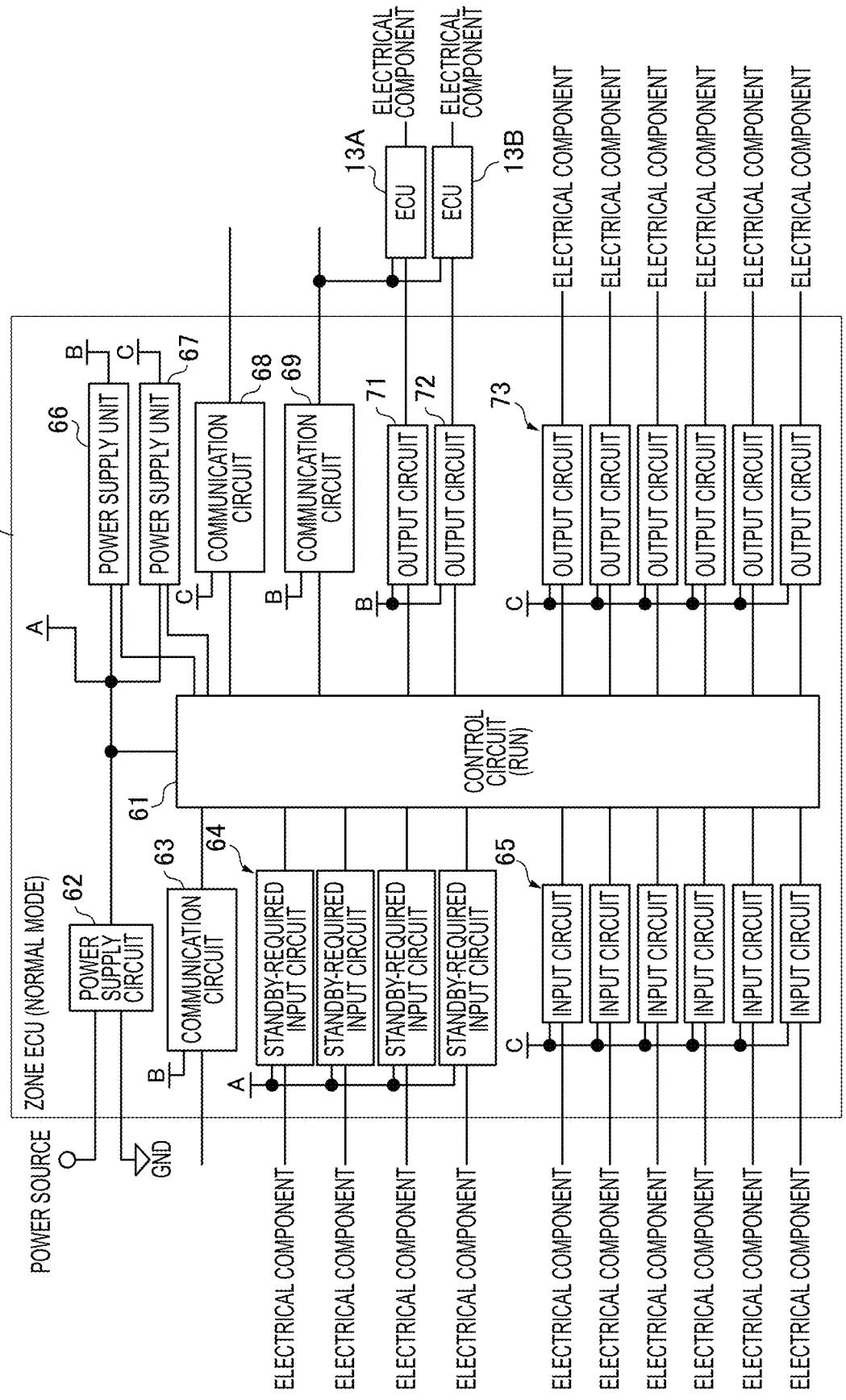
FIG. 8 is a block diagram showing an internal configuration of a zone ECU in a modification.

FIG. 8 is a block diagram showing an internal configuration of a zone ECU 12A in a modification.

The zone ECU 12A shown in FIG. 8 incorporates a control circuit 61, a power supply circuit 62, a communication circuit 63, four systems of standby-required input circuits 64, six systems of input circuits 65, power supply units 66 and 67, communication circuits 68 and 69, and output circuits 71, 72, and 73. Similarly to the control circuit 41, the control circuit 61 includes, for example, a processor and a memory, and instructions of software or the like stored in the memory, when executed by the processor, cause the zone ECU 12A to perform operations, for example, of an in-vehicle software updating method in the present modification.

An ECU 13A is connected to an output side of the output circuit 71, and an ECU 13B is connected to an output side of the output circuit 72.

In the zone ECU 12A in FIG. 8, in order to enable a state of the zone ECU 12A to be switched to three types of states, it is possible to supply power independently from three systems "A", "B", and "C" of the power source.

To the control circuit 61 incorporating the microcomputer, power is constantly supplied from the system "A" of the power source, and in addition thereto, power is supplied from the system "B" of the power source through the power supply unit 66, and power is supplied from the system "C" of the power source through the power supply unit 67.

Each standby-required input circuit 64 is operated by the power from the system "A" of the power source. The communication circuits 63 and 69, the power supply unit 66, and the output circuits 71 and 72 are operated by the power from the system "B" of the power source. The input circuits 65, the power supply unit 67, the communication circuit 68, and the output circuits 73 are operated by the power from the system "C" of the power source.

For example, in a situation in which the vehicle 17 allows relatively large power consumption in the zone ECU 12A as in a case where the ignition of the vehicle 17 is on, normal power from the power source is supplied to all circuits in the zone ECU 12A shown in FIG. 8. That is, the power from the three systems "A", "B", and "C" of the power source is supplied to each circuit in the zone ECU 12A. This situation corresponds to a normal mode in which the zone ECU 12A is activated. The control circuit 61 in the normal mode is in a (RUN) state in which a normal operation is enabled.

<State Change of Software Update Mode>

Figure 9:
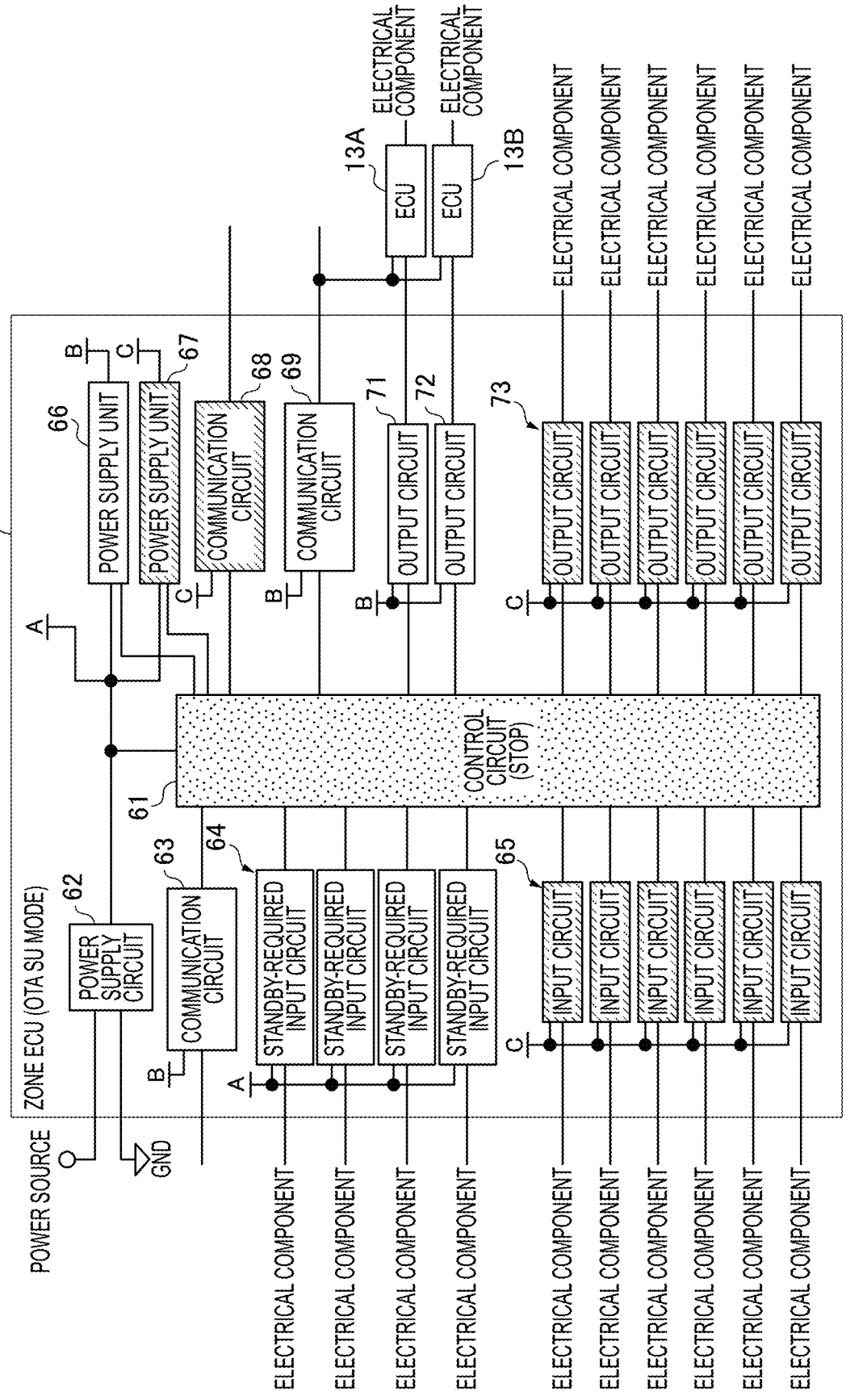
FIG. 9 is a block diagram showing an example of a state change of each component in the zone ECU in a software update mode.

FIG. 9 is a block diagram showing an example of a state change of each component in the zone ECU 12A in a software update (OTA SU) mode. In FIG. 9, the component in a state different from the normal mode is shown as a hatched block.

As shown in FIG. 9, in the software update mode, the power supply from the system "C" of the power source to the input circuits 65, the power supply unit 67, the communication circuit 68, and the output circuits 73 is stopped. The control circuit 61 is in a state (STOP mode) in which power consumption is reduced. The power supply circuit 62, the communication circuit 63, the standby-required input circuits 64, the power supply unit 66, the communication circuit 69, and the output circuits 71 and 72 are in the state in which the normal operation is enabled by the power supply from the system "A" or "B" of the power source.

Therefore, in the software update mode shown in FIG. 9, the power consumption of the zone ECU 12A is significantly reduced as compared with the normal mode in FIG. 8.

<State Change of Sleep Mode>

Figure 10:
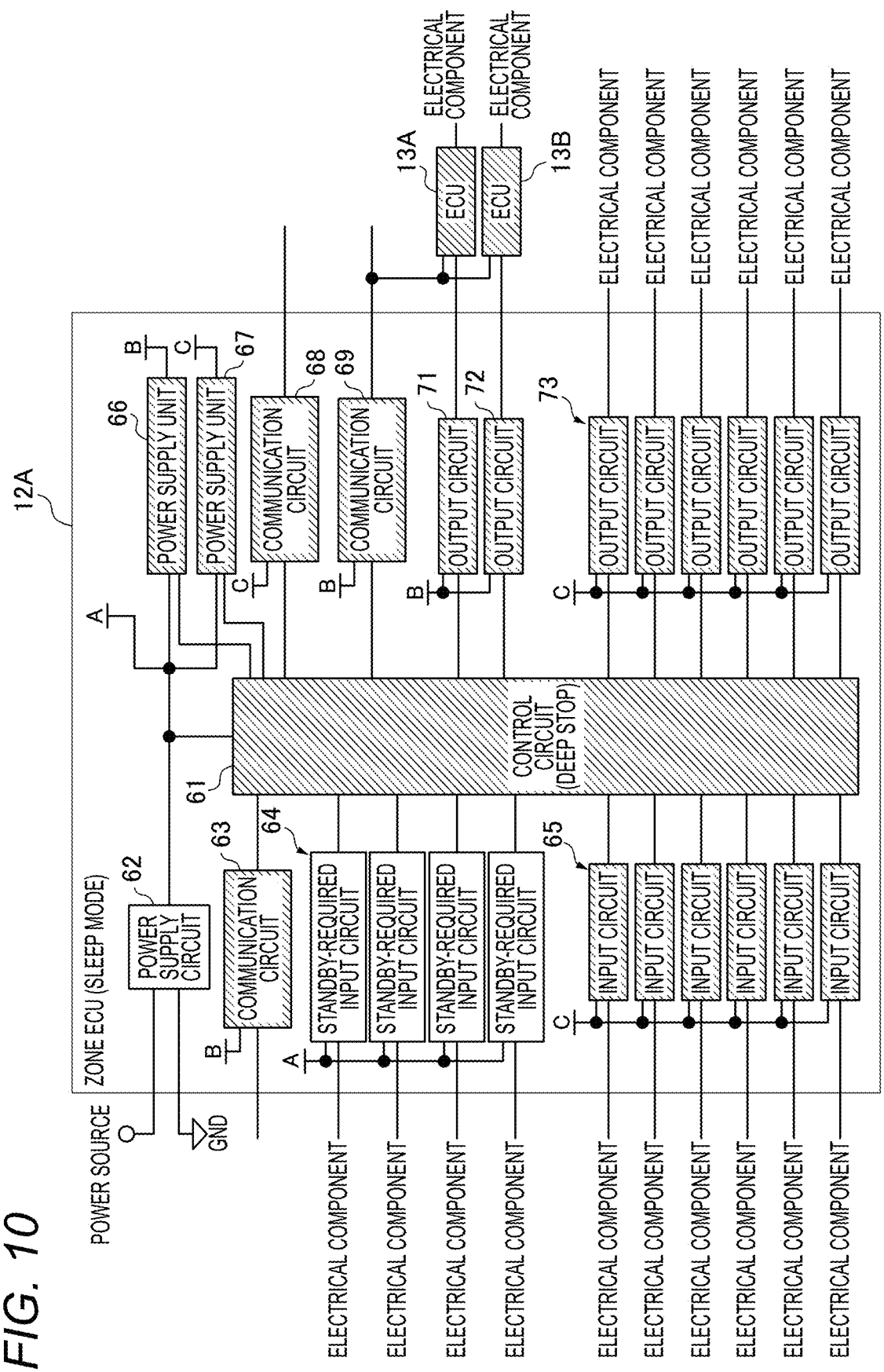
FIG. 10 is a block diagram showing an example of a state change of the component in the zone ECU in a sleep mode.

FIG. 10 is a block diagram showing an example of a state change of the component in the zone ECU 12A in a sleep mode. In FIG. 10, the component in a state different from the normal mode is shown as a hatched block.

As shown in FIG. 10, in the sleep mode, the power supply from the system "C" of the power source to the input circuits 65, the power supply unit 67, the communication circuit 68, and the output circuits 73 is stopped, and the power supply from the system "B" of the power source to the communication circuit 63, the power supply unit 66, the communication circuit 69, and the output circuits 71 and 72 is stopped. The control circuit 61 is in a (DEEP STOP) state in which power consumption is greatly reduced.

Therefore, in the sleep mode shown in FIG. 10, the power consumption of the zone ECU 12A is further reduced as compared with the software update mode in FIG. 9.

That is, by switching the state of the zone ECU 12A to any one of the states in FIGS. 8, 9, and 10, it is possible to selectively use three types of power consumption states.

Table 1 below shows a list of function ON/OFF categories of each unit in the zone ECU 12A in these three types of modes.

TABLE 1

| Zone ECU Mode | Micro-computer Mode | Standby-Required I/O | Other I/O | Communication Gateway | CAN |
|---|---|---|---|---|---|
| Normal Mode | RUN Mode | ON | ON | ON | ON |
| Sleep Mode | Deep Sleep Mode | ON | OFF | OFF | OFF |
| OTA SU Mode | STOP Mode | ON | OFF | OFF | ON |

The "standby-required I/O" in Table 1 corresponds to an input/output (I/O) interface for connecting to, for example, a remote keyless function or a smart key function. In addition, "ON" of a "CAN" system in the software update mode in Table 1 is limited to only a bus related to a corresponding software update.

<Operation of Zone ECU 12A>

Figure 11:
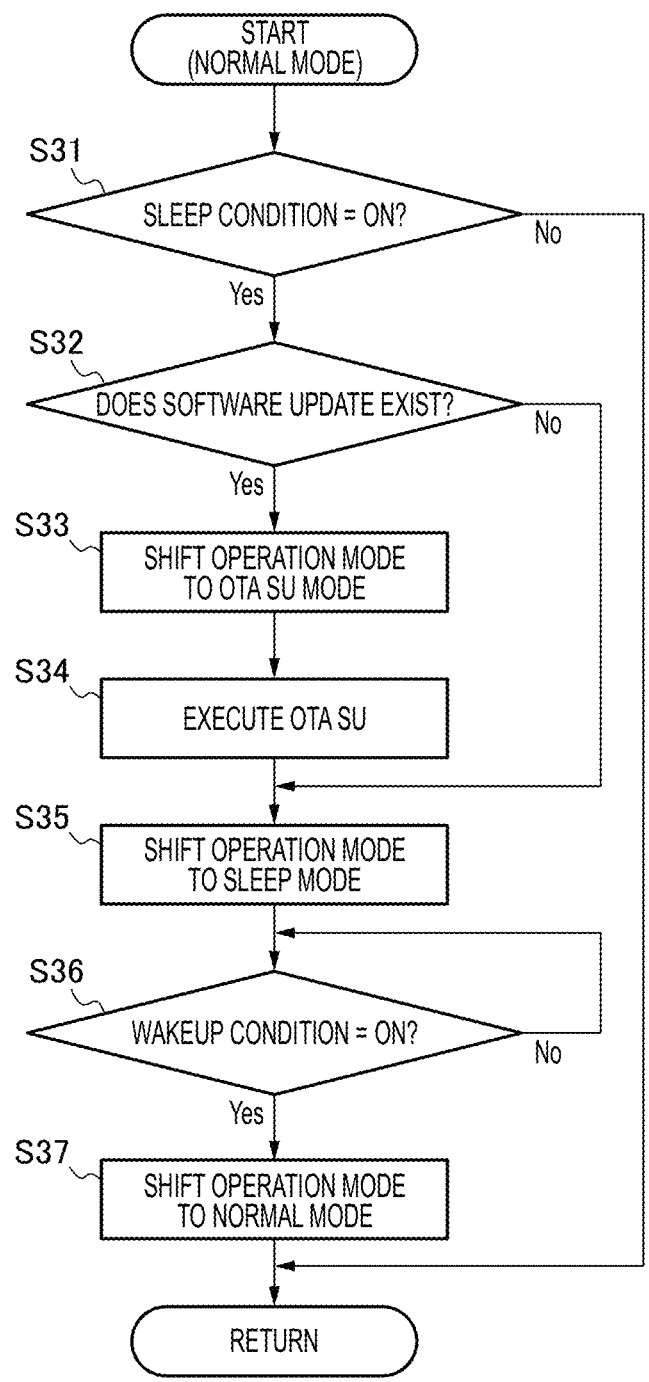
FIG. 11 is a flowchart showing control of mode transition in the zone ECU in FIG. 8.

FIG. 11 is a flowchart showing control of mode transition in the zone ECU 12A in FIG. 8.

When the zone ECU 12A in FIG. 8 is used, an operation of downloading the update data of the cloud 20 and storing the update data in the update-dedicated memory area 12a is also performed while the vehicle 17 is traveling, that is, when the ignition is on. Whether the software update can be performed is confirmed in advance by an input operation of a driver. When the driver permits the software update in advance, the zone ECU 12A starts processing for the software update after the ignition is switched off.

The contents of the control shown in FIG. 11 will be described below.

The zone ECU 12A starts the processing from step S31 in FIG. 11 when operating in the normal mode. In S31, the zone ECU 12A identifies whether a predetermined sleep condition is ON.

For example, any one of conditions such as when the ignition is off, a door is opened, and after a key is locked, or a combination of a plurality of these conditions is identified as the sleep condition in S31. When the sleep condition is ON, the zone ECU 12A proceeds the processing from S31 to S32.

In S32, the zone ECU 12A identifies the presence or absence of software update. That is, the zone ECU 12A identifies whether update data that can be used to update software of the zone ECU 12A or the like is stored in the update-dedicated memory area 12a. When the software update is presence, the process proceeds from S32 to S33, and when the software update is absence, the process proceeds from S32 to S35.

Before starting the software update processing, the zone ECU 12A shifts the operation mode of the zone ECU 12A to the software update mode shown in FIG. 9 (S33). Accordingly, the software update can be executed in a situation in which the consumption of the power from the power source by the zone ECU 12A is reduced.

The zone ECU 12A starts the software update processing in S34. Then, after the software update processing is completed, the process proceeds to S35.

The zone ECU 12A transitions the operation mode of the zone ECU 12A to the sleep mode shown in FIG. 10 in S35. Accordingly, the consumption of the power from the power source by the zone ECU 12A is very small, and an influence on the voltage of the in-vehicle battery 15 is almost eliminated.

The zone ECU 12A identifies in S36 whether a predetermined wakeup condition is turned ON, and when the wakeup condition is turned ON, the zone ECU 12A transitions the operation mode of the zone ECU 12A to the normal mode shown in FIG. 8 in S37.

As described above, in the in-vehicle system 10 shown in FIG. 1, the zone ECU 12 can perform the in-vehicle software updating method as in the operation shown in FIG. 7. Therefore, even in a situation in which the actual voltage Vx of the in-vehicle battery 15 decreases earlier than an expectation of the predicted voltage Vp as shown in FIG. 6, the software update may be continued as it is without being interrupted by considering the progress rate of the software update, or shifting the operation mode of the zone ECU 12 to the power saving mode. Accordingly, a frequency of interruption of software update can be reduced. That is, the same software update can be prevented from being repeated, and the software update can be efficiently performed.

In particular, in the operation in FIG. 7, when the voltage Vx decreases to the low voltage caution threshold VL2, the predicted voltage Vp2 is calculated again (S19) in consideration of the fact that the operation mode of the zone ECU 12A is switched to the power saving mode (S18), and thus there is a high possibility that the software update can be continued to the end.

The zone ECU 12 performs download when the ignition of the vehicle 17 is on, and starts the software update after the ignition is switched off, and thus the software update can be efficiently executed. That is, when the ignition is off, an influence such as an interrupt by other ECUs unrelated to the software update is less likely to occur, and thus the software can be updated in a good environment.

Even after the zone ECU 12 switches the operation mode of the zone ECU 12 to the power saving mode during the software update, the zone ECU 12 performs control so as to maintain the battery voltage equal to or greater than the low voltage threshold VL1 (S23), and thus the battery of the vehicle 17 can be prevented from running out.

By switching the operation mode of the zone ECU 12A as shown in FIGS. 8 to 10, the battery can be more effectively prevented from running out due to the software update.

The in-vehicle software updating method according to the embodiment of the present disclosure is an in-vehicle software updating method for updating software in the in-vehicle system 10 including a zone control unit (for example, the zone ECU 12) configured to manage a plurality of control targets (for example, the terminal ECU 13 and the smart actuator 14) connected on a downstream side of the zone control unit, the in-vehicle software updating method including: retaining update data in a first area (for example, the update-dedicated memory area 12a) allocated in advance in a memory of the zone control unit; calculating, before starting software update using the update data, a first predicted voltage value (for example, the predicted voltage Vp) of an in-vehicle power source at an update completion time; starting the software update in a case in which the first predicted voltage value is greater than a first threshold (for example, the low voltage threshold VL1) (S12 and S14); acquiring, after starting the software update, a voltage measurement value (for example, the voltage Vx) of the in-vehicle power source; acquiring a progress rate in the software update in a case in which the voltage measurement value is equal to or less than a second threshold (for example, the low voltage caution threshold VL2) (S17), the second threshold being greater than the first threshold; interrupting the software update in a case in which the progress rate is less than a set value; and switching an operation mode of the zone control unit to a power saving mode in a case in which the progress rate is equal to or greater than the set value (S18), calculating a second predicted voltage value (for example, the predicted voltage Vp2) of the in-vehicle power source at the update completion time, and continuing the software update in a case in which the second predicted voltage value is greater than the first threshold (for example, the low voltage threshold VL1) (S21).

According to this method, even when the voltage of the in-vehicle power source decreases earlier than expected after the start of the software update, the software update can be continued as it is when the progress rate of the software update at that time point is equal to or greater than the set value. Therefore, a situation in which the same software update is repeated many times due to occurrence of interruption can be reduced, and wasted power consumption and wasted time can be reduced. Even if the progress rate of the software update is equal to or greater than the set value, the software update can be interrupted when the second predicted voltage value is equal to or less than the first threshold, and thus the voltage of the in-vehicle power source can be managed so as to be maintained greater than the first threshold.

The in-vehicle system 10 according to the embodiment of the present disclosure includes a zone control unit (for example, the zone ECU 12) configured to manage a plurality of control targets (for example, the terminal ECU 13 and the smart actuator 14) connected on a downstream side of the zone control unit. A memory of the zone control unit has a first area (for example, the update-dedicated memory area 12a) configured to retain update data usable for software update of the plurality of control targets, and the zone control unit is configured to: calculate, before starting software update using the update data of the first area, a first predicted voltage value (for example, the predicted voltage Vp) of an in-vehicle power source at an update completion time (S11); start the software update in a case in which the first predicted voltage value is greater than a first threshold (for example, the low voltage threshold VL1) (S12 and S14); acquire, after starting the software update, a voltage measurement value (for example, the voltage Vx) of the in-vehicle power source (S16); acquire a progress rate in the software update in a case in which the voltage measurement value is equal to or less than a second threshold (for example, the low voltage caution threshold VL2), the second threshold being greater than the first threshold (S17); interrupt the software update in a case in which the progress rate is less than a set value (S17), switch an operation mode of the zone control unit to a power saving mode in a case in which the progress rate is equal to or greater than the set value (S18), calculate a second predicted voltage value (for example, the predicted voltage Vp2) of the in-vehicle power source at the update completion time, and continue the software update in a case in which the second predicted voltage value is greater than the first threshold (for example, the low voltage threshold VL1) (S21).

According to this configuration, even when the voltage of the in-vehicle power source decreases earlier than expected after the start of the software update, the software update can be continued as it is when the progress rate of the software update at that time point is equal to or greater than the set value. Therefore, a situation in which the same software update is repeated many times due to occurrence of interruption can be reduced, and wasted power consumption and wasted time can be reduced. Even if the progress rate of the software update is equal to or greater than the set value, the software update can be interrupted when the second predicted voltage value is equal to or less than the first threshold, and thus the voltage of the in-vehicle power source can be managed so as to be maintained greater than the first threshold.

The zone control unit is configured to: assign a priority to each of a plurality of electric circuits, the plurality of electric circuits being under the management of the zone control unit; and switch, in the power saving mode, a state of power supply to the plurality of electric circuits to a state (see FIG. 4) of inhibiting power supply to at least one electric circuit having a low priority among the plurality of electric circuits such that a change in the power supply is reflected in calculation of the second predicted voltage value (for example, the predicted voltage Vp2).

According to this configuration, when the voltage of the in-vehicle power source decreases earlier than expected after the start of the software update, the operation mode of the zone control unit is switched to the power saving mode, so that a function of the electric circuit having a low priority can be inhibited, and a consumption speed of the in-vehicle power source can be slowed down. Accordingly, a probability that the software update can be continued increases.

The zone control unit is configured to: store, in the first area, the update data downloaded from a software supply source in response to an ignition of a vehicle being on; and shift, after the ignition is switched off, the operation mode of the zone control unit to a software update mode using the update data.

According to this configuration, when the update data is downloaded, power of the power source supplied from a power generator (for example, the alternator) of a vehicle can be used, and thus the download can be executed efficiently in a situation in which it is not necessary to consider consumption of an in-vehicle battery. In addition, when the software update is executed, update processing can be started in a state where a large number of ECUs stop functions thereof as in a case where a host vehicle is parked, and thus the update processing is less likely to be affected by interrupt processing or the like by other ECUs, and can be executed efficiently.

The zone control unit is configured to: repeatedly acquire the voltage measurement value of the in-vehicle power source after switching the operation mode of the zone control unit to the power saving mode; and interrupt the software update in a case in which the voltage measurement value (for example, the voltage Vx) is equal to or less than the first threshold (for example, the low voltage threshold VL1) (S23).

According to this configuration, even when the software update is continued as it is in a situation in which the progress rate of the software update is equal to or greater than the set value, the software update is interrupted at that time point when the voltage of the in-vehicle power source actually decreases to the first threshold, and thus the voltage of the in-vehicle power source can be managed so as to be maintained equal to or greater than the first threshold.

According to the in-vehicle software updating method and the in-vehicle system in the present disclosure, the wasted power consumption and the wasted time caused by interruption of the software update can be reduced. That is, even when the voltage of the in-vehicle power source decreases earlier than expected after the start of the software update, the software update can be continued when the progress rate of the software update at that time point is equal to or greater than the set value. Therefore, a situation in which the same software update is repeated many times due to occurrence of interruption can be reduced.

The invention claimed is:

1. An in-vehicle software updating method for updating software in an in-vehicle system, the in-vehicle system comprising a zone control unit configured to manage a plurality of control targets connected on a downstream side of the zone control unit, the in-vehicle software updating method comprising:
    retaining update data in a first area allocated in advance in a memory of the zone control unit;
    calculating, before starting software update using the update data, a first predicted voltage value of an in-vehicle power source at an update completion time;
    starting the software update in a case in which the first predicted voltage value is greater than a first threshold;
    acquiring, after starting the software update, a voltage measurement value of the in-vehicle power source;
    acquiring a progress rate in the software update in a case in which the voltage measurement value is equal to or less than a second threshold, the second threshold being greater than the first threshold;
    interrupting the software update in a case in which the progress rate is less than a set value; and
    switching an operation mode of the zone control unit to a power saving mode in a case in which the progress rate is equal to or greater than the set value, calculating a second predicted voltage value of the in-vehicle power source at the update completion time, and continuing the software update in a case in which the second predicted voltage value is greater than the first threshold.

2. An in-vehicle system comprising:
    a zone control unit configured to manage a plurality of control targets connected on a downstream side of the zone control unit,
    wherein a memory of the zone control unit has a first area configured to retain update data usable for software update of the plurality of control targets, and
    wherein the zone control unit is configured to:
        calculate, before starting software update using the update data in the first area, a first predicted voltage value of an in-vehicle power source at an update completion time,
        start the software update in a case in which the first predicted voltage value is greater than a first threshold,
        acquire, after starting the software update, a voltage measurement value of the in-vehicle power source,
        acquire a progress rate in the software update in a case in which the voltage measurement value is equal to or less than a second threshold, the second threshold being greater than the first threshold,
        interrupt the software update in a case in which the progress rate is less than a set value, and
        switch an operation mode of the zone control unit to a power saving mode in a case in which the progress rate is equal to or greater than the set value, calculate a second predicted voltage value of the in-vehicle power source at the update completion time, and continue the software update in a case in which the second predicted voltage value is greater than the first threshold.

3. The in-vehicle system according to claim 2, wherein the zone control unit is configured to:
    assign a priority to each of a plurality of electric circuits, the plurality of electric circuits being under the management of the zone control unit; and
    switch, in the power saving mode, a state of power supply to the plurality of electric circuits to a state of inhibiting power supply to at least one electric circuit having a low priority among the plurality of electric circuits such that a change in the power supply is reflected in calculation of the second predicted voltage value.

4. The in-vehicle system according to claim 2, wherein the zone control unit is configured to:
    store, in the first area, the update data downloaded from a software supply source in response to an ignition of a vehicle being on; and
    shift, after the ignition is switched off, the operation mode of the zone control unit to a software update mode using the update data.

5. The in-vehicle system according to claim 2, wherein the zone control unit is configured to:
    repeatedly acquire the voltage measurement value of the in-vehicle power source after switching the operation mode of the zone control unit to the power saving mode; and
    interrupt the software update in a case in which the voltage measurement value is equal to or less than the first threshold.

* * * * *